2,763,591

TETRACYCLINE PRODUCTION USING COTTONSEED ENDOSPERM FLOUR

Alden B. Hatch, Fayetteville, George A. Hunt, Syracuse, and Joseph Lein, Fayetteville, N. Y., assignors to Bristol Laboratories Inc., Onondaga County, N. Y., a corporation of New York No Drawing. Application December 7, 1954, Serial No. 473,756

7 Claims. (Cl. 195—80)

This invention relates to a method of producing tetracycline by fermentation of micro-organisms and, more particularly, to the use in such fermentation media of substantially oil-free, cottonseed endosperm flour.

Tetracycline is a relatively new, broad-spectrum antibiotic which has been described in J. Amer. Chem. Soc. 75, 4621–4623 (1953), in Antibiotics Annual pages 46–107 (especially p. 54) (1953–54) and in Annals N. Y. Acad. Sci., vol. 60, pages 1–82 (1954), where it is noted that fermentation broths of Streptomyces aureofaciens contain a mixture of chlortetracycline (Aureomycin) and tetracycline. The patents of Duggar (U. S. Patent 2,482,055) and Niedercorn (U. S. Patent 2,609,329) disclose numerous media useful for the production of chlortetracycline by fermentation of Streptomyces aureofaciens. The production of broths containing mixtures of chlortetracycline and tetracycline by fermentation of Streptomyces aureofaciens, Streptomyces viridifaciens and other new species of Streptomyces, and the recovery of tetracycline therefrom has been disclosed by my colleagues B. Heinemann and I. R. Hooper in their application with particular reference to the use of dechlorinated media to increase the proportion of tetracycline. Another co-pending application of Joseph Lein and Alexander Gourevitch discloses the use in such fermentations of an inhibitor of fermentative chlorination.

It is the object of the present invention to provide novel and improved media for the production of tetracycline by fermentation of Streptomyces aureofaciens, Streptomyces viridifaciens and the like which provide increased total amounts of tetracycline and also provide a very high ratio of tetracycline to chlortetracycline without the disadvantages in expense, additional labor, increased cycle time, added chemicals, lowered potency, and increased difficulty of purification introduced by the use of dechlorinating agents, chloride-free inorganic sources of nitrogen or inhibitors of fermentative chlorination.

The object of the present invention has been attained and there is now provided by the present invention a process for the production of tetracycline which comprises aerobically growing a culture of a chlortetracycline producing species of Streptomyces in an aqueous carbohydrate solution containing substantially oil-free, cottonseed endosperm flour.

With respect to certain more specific embodiments of the present invention, there is provided by the present invention, a process for the production of tetracycline which comprises areobically growing a culture of a chlortetracycline-producing species of Streptomyces in an aqueous, carbohydrate solution containing as its sole source of organic nitrogenous nutrients a mixture of substantially oil-free, cottonseed endosperm flour and either bakers' yeast or dechlorinated corn steep liquor.

Tetracycline is thus prepared by cultivation under said particular, controlled conditions of all chlortetracycline-producing species of Streptomyces, including S. aureofaciens (NRRL 2209) and a new species of Streptomyces tentatively called Streptomyces BL–567201 and now named Streptomyces viridifaciens which was isolated from a sample of soil. A culture of the living organism has been deposited in the American Type Culture Collection, Washington, D. C., added to its permanent collection of micro-organisms as ATCC 11989 and made available to the public therefrom. The description of this organism is set forth in the following.

The organism Streptomyces viridifaciens which produces tetracycline belongs to the genus distinguished as Streptomyces. Growth of this organism is good on glycerol-asparagine-beef extract agar at 30° C. On this medium mouse-gray aerial hyphae are formed and a yellowish-green pigment is secreted into the agar medium. The mycelium is composed of branched hyphae, the younger elements of which are Gram-positive. Condida are produced on aerial hyphae.

The Streptomyces viridifaciens was differentiated from a strain of S. auerofaciens (NRRL 2209) obtained from the Northern Regional Research Laboratory, Peoria, Illinois, where it had been deposited as an authentic aureomycin-producing strain, by observation of growth characteristic on glycerol asparagine beef extract agar and Czapek-Doz agar containing 1% dextrin. The agar mixtures employed and the results obtained were as follows:

GLYCEROL ASPARAGINE BEEF EXTRACT AGAR

| | |
|---|---|
| Glycerol | percent 1 |
| Asparagine | do 0.05 |
| Beef extract | do 0.2 |
| $K_2HPO_4$ | do 0.05 |
| Agar | do 1.5 |
| Sterile water, q. s. | do 100 |
| pH | do 7.2 |

| | Streptomyces viridifaciens | Streptomyces aureofaciens |
|---|---|---|
| Growth | Good | Good. |
| Sporulation | do | Do. |
| Diffusible pigment | Yellowish-green | None. |
| Spiral formation | Abundant, loosely wound | Do. |
| Aerial hyphae | Mouse-gray | Rose-gray. |
| Reverse | Brown | Olive-drab. |

DEXTRIN CZAPEK-DOX

| | |
|---|---|
| $NaNO_3$ | percent 0.2 |
| $K_2HPO_4$ | do 0.1 |
| $MgSO_4$ | do 0.05 |
| $KC_1$ | do 0.05 |
| $FeSO_4$ | trace |
| Agar | do 1.5 |
| Sterile water, q. s. | do 100 |
| pH | do 7.2 |

| | Streptomyces viridifaciens | Streptomyces aureofaciens |
|---|---|---|
| Growth | Fair to good | Fair. |
| Sporulation | Good | Poor. |
| Diffusible Pigment | None | None. |
| Spiral formation | Abundant, loosely wound. | Sparse, very loosely wound. |
| Aerial hyphae | Mouse-gray | Buff to gray. |
| Reverse | Light brown | Buff to tan. |

The Streptomyces viridifaciens is further characterized by production of an intense bluish-green pigment when grown in submerged culture in a medium containing 1% sucrose, 1% soy bean meal, 1% soy peptone, 1.5% $K_2HPO_4$, and 0.5% $(NH_4)_2HPO_4$. Streptomyces aureofaciens (NRRL 2209) does not produce this pigment.

Streptomyces viridifaciens was further distinguished from Streptomyces aureofaciens by the following tabulated observations.

| Medium | NRRL 2209 S. aureofaciens | Streptomyces viridifaciens |
|---|---|---|
| Nutrient agar | Good growth. Production of aerial hyphae and spores is inhibited somewhat and is white to gray in color. Straw soluble pigment. | Good growth. No aerial mycelium, colony tan to light brown. Cinnamon soluble pigment. |
| Asparagine-meat extract-dextrose agar. | Good growth. Abundant aerial mycelium and spores, cement gray to frost gray in color. India buff soluble pigment. | Good growth. Abundant aerial mycelium and spores, gull colored, India buff soluble pigment. |
| Potato slants | Growth raised, surface nodulate, India buff color. | Growth raised, surface nodulate, ecru-beige. |
| Litmus Milk | Neither significant pH change nor apparent peptonization in 15 days. | Alkaline with peptonization. Very good growth. |

The above color descriptions are from: Dictionary of Color; by Maerz and Paul 1st edition.

It is to be understood that the production of tetracycline by the process of this invention is not limited to these particular organisms or to organisms fully answering the above descriptions which are given merely for illustrative purposes. Especially included is the use of organisms which are mutants produced from the described organisms by mutating agents such as X-radiation, ultra-violet, radiations, nitrogen mustards, etc.

This invention provides a process for growing species of micro-organisms at 24°–35° C. under submerged conditions of aeration in media containing a source of carbon, a particular source of nitrogen, mineral salts such as potassium phosphate, magnesium sulfate, sodium nitrate and traces of elements such as zinc, manganese and copper, but excluding chlorides and, when desired, a buffering agent such as calcium carbonate.

As a source of carbon in the nutrient medium carbohydrates are satisfactory. Any of the following can be used:

Ordinary starch
Soluble starch
Sucrose
Glucose
Maltose
Dextrose
Glycerol
Galactose
Soybean oil
Xylose
Arabinose
Rhamnose
Fructose
Lactose
Inulin
Dextrin
Mannitol
Lard oil
Corn oil
Peanut oil
Cottonseed oil
Soya bean oil
Olive oil
Sperm oil
Palm oil
Whale oil
Glyceryl monostearate
Glyceryl mono-oleate These carbon sources are supplied to the medium in purified form or in the form of concentrates. The amount of such carbon sources for best antibiotic production in the medium varies considerably, from about ½% to 5%, by weight of the total weight of the fermentation medium.

In the present invention, inorganic sources of nitrogen, such as ammonium salts and nitrates may be used but are not essential.

With respect to the necessary, organic sources of nitrogen it has been customary in the art to use such materials as:

Amino acids, asparagine
Casein, both hydrolyzed and unhydrolyzed
Fish meal
Soy bean meal
Meat extracts
Liver cake
Distillers grain slop
Corn-steeping liquor
Wheat-steeping liquor
Palm oil meal
Coconut oil meal
Whey or whey concentrates
Acid hydrolyzed corn gluten
Acid hydrolyzed wheat gluten
Peptone
Offals
Brewers yeast
Cottonseed meal
Lactalbumin
Tryptone
Linseed oil meal
Peanut oil meal
Sunflower oil meal It has been found, in the present invention, that superior results with respect to tetracycline potency are obtained by avoiding the use of these materials in favor of the use of substantially oil-free, cottonseed endosperm flour, either alone or in combination with either bakers' yeast or dechlorinated corn-steep liquor. The cottonseed endosperm flour need not be applied in a high degree of purity. An amount of about 0.1% to 10.0% by weight on a solid basis, and preferably 1.0–1.25%, describes the useful range to be added to the media in most cases. The cottonseed endosperm flour is available commercially (e. g., as Pharmamedia or Proflo from Traders Oil Mill Co., Fort Worth, Texas) and is prepared by cooking dehulled cottonseeds, extruding at least 95 per cent of the oil therein, and collecting by air-settling the endosperm, which is then ground to a flour, i. e. 370 mesh. Thus the phrase "substantially oil-free" refers to the fact that this flour contains less than five per cent of the original content of oil of the cottonseed. This cottonseed endosperm flour is an entirely different material than cottonseed meal, which is not as suitable for use in the production of tetracycline because it leads to the production of too much chlortetracycline.

In addition to the cottonseed endosperm flour as a source of organic nitrogen, it has been found advantageous but not essential to use in amounts of from 0.1% to 10.0% either bakers' yeast (e. g. Fleischmann 2019) or dechlorinated corn steep liquor to increase the overall yield of tetracycline without lowering this ratio of tetracycline to chlortetracycline.

The following examples are provided for purposes of illustration only and are not to be construed as limiting the invention.

*Example I*

A chlortetracycline-producing species of Streptomyces (*Streptomyces aureofaciens*) was aerobically fermented for four days in a sterile medium containing 2.7% sucrose, 0.003% $ZnSO_4.7H_2O$, 0.4% $CaCO_3$, 0.6% substantially oil-free cottonseed endosperm flour (Pharmamedia) and 0.4% $(NH_4)_2SO_4$. The duplicate broths contained 138 and 164 mcg./ml. tetracycline by ultra-violet absorption analysis. The broths contained 98% and 100% tetracycline by differential bioassay for tetracycline and chlortetracycline.

*Example II*

A chlortetracycline-producing species of Streptomyces (*Streptomyces aureofaciens*) was aerobically fermented for four days in a sterile medium containing 3.0% sucrose, 0.003% $ZnSO_4.7H_2O$, 0.4% $CaCO_3$, 0.3% $(NH_4)_2SO_4$ and substantially oil-free cottonseed endosperm flour (Pharmamedia) as indicated below with the following, tabulated results:

| Percent Pharmamedia | Tetracycline in mcg./ml. by U.-V. assay | Percent Tetracycline by Differential Bioassay |
|---|---|---|
| 0.4 | 50–96 | |
| 0.6 | 272–288 | |
| 0.8 | 330–410 | 96 |
| 1.0 | 505–480 | 98 |
| 1.25 | 540–465 | 93 |
| 0.4 [1] | 1,138–1,034 | 95 |
| 0.6 [1] | 1,145–1,118 | 91 |

[1] Plus 1.25% dechlorinated corn steep liquor.

Example III

A chlortetracycline-producing species of Streptomyces (*Streptomyces aureofaciens*) was aerobically fermented for four days in a sterile medium containing 3.0% sucrose, 0.003% $ZnSO_4.7H_2O$, 0.4% $CaCO_3$, 0.4% $(NH_4)_2SO_4$, 1.0% substantially oil-free cottonseed endosperm flour (Pharmamedia) and a supplement as indicated with the following tabulated results:

| Supplement | Conc'n. | Tetracycline in mcg./ml. by U.-V. assay |
|---|---|---|
| Baker's yeast (Fleischmann 2019) | 0.1% | 556; 578 |
|  | 0.2% | 834; 885 |
| Liver Protein Factor | 0.1% | 430; 350 |
|  | 0.2% | 595; 612 |
| Staclipse I | 0.1% | 200; 190 |
|  | 0.2% | 235; 190 |
| Vitamin $B_{12}$ | 1.0 mcg./ml. |  |
| Riboflavin | 20 | 224; 328 |
| Thiamine | 5 |  |
| Cottonseed meal | 0.2% | 200; 225 |
|  | 0.4% | 448; 310 |
| Egg Powder | 0.1% | 240; 298 |
|  | 0.2% | 540; 595 |
| Soy Bean Oil | 0.1% | 372; 318 |
|  | 0.2% | 344; 320 |

The broths using bakers' yeast as a supplement produced by far the greatest amount of activity. Upon analysis by differential bioassay and by paper strip chromatography they were found to contain 94–100% tetracycline.

Example IV

The superiority of substantially oil-free, cottonseed endosperm flour over the cottonseed meal known to the art was shown in the following manner using equal amounts of nitrogen.

A sterile medium comprising 3.0% sucrose, 0.2% bakers' yeast (Fleischmann 2019), 0.3% $(NH_4)_2SO_4$, 0.4% $CaCO_3$, 0.003% $ZnSO_4.7H_2O$ and one additional ingredient as given below was inoculated with 36–48 hour vegetative mycelium of a chlortetracycline-producing species of Streptomyces (*Streptomyces aureofaciens*), aerobically fermented for four days and the broths were assayed with the following tabulated results:

| Additional Ingredient | | Tetracycline Equivalents in mcg./ml. |
|---|---|---|
| Type (percent nitrogen) | Percent Used |  |
| Pharmamedia (57%) | 0.5 | 852; 888 |
|  | 1.0 | 850; 926 |
| Proflo (61%) | 0.47 | 845; 857 |
|  | 0.94 | 990; 972 |
| Cottonseed meal (43%) | 0.66 | 710; 647 |
|  | 1.33 | 346; 252 |

Differential analyses on the most productive broth (0.94% Proflo) showed 85–94% tetracycline.

Example V

A sterile medium comprising 0.2% bakers' yeast (Fleischmann 2019), 0.003% $ZnSO_4.7H_2O$, 4.75% sucrose, 2.0% Pharmamedia, 0.7% $CaCO_3$, and 0.4% $(NH_4)_2SO_4$ was aerobically fermented four days after inoculation with a chlortetracycline producing species of Streptomyces (*Streptomyces aureofaciens*) to give a broth containing 1175–1200 mcg./ml. of tetracycline equivalents by ultra-violet absorption assay and containing 93% tetracycline by differential bio-assay. Excellent yields of tetracycline were also obtained using 0.5, 1.0 and 1.5 per cent Pharmamedia, 0.4, 0.5 and 0.6 per cent $CaCO_3$, 3.0 and 4.0 per cent sucrose and 0.3 and 0.5 per cent $(NH_4)_2SO_4$.

Example VI

Following the procedure of Example II, using dechlorinated corn steep liquor as the only organic source of nitrogen, broths containing 852 mcg./ml. tetracycline were obtained; the addition of 0.5% Pharmamedia raised the potency to 1170 mcg./ml. In another experiment using only dechlorinated corn steep liquor the broth potency was 866 mcg./ml.; it was raised to 1014 mcg./ml. by the addition of 1.0% Pharmamedia.

Example VII

A chlortetracycline-producing species of Streptomyces (*Streptomyces aureofaciens*) was aerobically fermented in a 30,000 gallon tank containing sterilized media comprising 4.0% sucrose, 2.5% dechlorinated corn steep liquor, 0.75% $CaCO_3$, 0.2% $(NH_4)_2SO_4$, 0.003% $ZnSO_4.7H_2O$ and 0.02% Fe–3 Specific Versene (an iron chelating agent). At the end of 70 hours, the broth contained 555 mcg./ml. tetracycline. Differential bio-assay showed 100% tetracycline.

The next day a fermentation was run using the same size tank, the same strain of the same species of Streptomyces, the same operating conditions, and the same medium except for the addition of 1.0% substantially oil-free cottonseed endosperm flour (Pharmamedia). At the end of 70 hours, the broth contained 1023 mcg./ml. tetracycline. Differential bio-assay showed 99% tetracycline.

The dechlorinated corn steep liquor used above in some examples is prepared in the following manner.

Such removal is practical even on a commercial scale, e. g. by dialysis or electrodialysis, by precipitation as with silver nitrate, or mercurous nitrate, chlorate or acetate, by passage through columns of anion-exchange resins in the hydroxyl, sulfate, bromide, nitrate, or citrate or similar cycle but other than in the chloride form, of course. Examples of such resins are Amberlite IR–45 or the similar Dowex 3, which are weakly basic anion exchange resins having a divinyl-benzene-polystyrene matrix with free primary amino groups; Dowex 1, or Amberlite IRA400 which are strongly basic anion exchange resins having a divinyl-benzene-polystyrene matrix with trimethylamine groups; Dowex 2, or Amberlite IRA410 which are strongly basic anion exchange Amberlite resins having a divinylbenzene-polystyrene matrix with dimethyl-ethanolamine groups; and the Amberlite IR–4B, an anion exchange resin having a phenol-formaldehyde matrix with primary amino groups.

The amount of chloride ion present is easily determined by the usual methods. By available chloride ion is meant chloride ion which can be utilized by the microorganism; thus the chloride in a precipitate of silver chloride or mercurous chloride may, according to theories of inorganic chemistry, exist in ionic form but it is well recognized as being not available as it is tightly held in the insoluble precipitate.

Usually the chloride ion is actually removed from the corn steep liquor before the fermentation, e. g. by the passage of aqueous solutions or suspensions of corn steep liquor thru a column of an anion-exchange resin, e. g. in the hydroxyl, sulfate or nitrate form, or by collection and removal by filtration of silver chloride precipitated from an aqueous solution. The corn steep liquor to be substantially free of available chloride ion (i. e., dechlorinated) must contain less than 20 p. p. m. chloride ion, and preferably only 1 to 2 p. p. m. of chloride ion, when diluted to the usual one to three per cent level used in the fermentation. The following examples demonstrate the process of dechlorinating corn steep liquor.

Example A

Corn steep liquor as commercially available was freed of chloride ion in the following manner. The corn steep assayed about 3000 p. p. m. chloride ion and was first treated with silver nitrate. Three methods were used:

(A) Simple addition of silver nitrate.

(B) Removal of solids by filtration followed by addition of silver nitrate and then removal of silver chloride by filtration and, finally recombination by slurry of the original corn steep solids with the filtrate from the silver chloride precipitation.

(C) Removal of solids by filtration followed by addition of silver nitrate, and finally removal of precipitated silver chloride by filtration. The amounts of silver nitrate added (0.54 g.; 0.72 g.; 0.90 g.) were those calculated to precipitate 75%, 100% and 125% of the chloride ion, respectively; in each case 50 ml. corn steep was used.

*Example B*

The corn steep liquor contained about 3000 p. p. m. chloride ion which was removed in the following manner. The corn steep was filtered and diluted with four volumes of water; the solids were washed with water which was used to dilute the filtrate. The combined filtrates were acidified with ml. concentrated nitric acid per 100 ml. of original corn steep and dechlorinated by the addition of 200% of the amount of silver nitrate necessary to remove by precipitation all chloride ion present as determined by simple analysis. One reason for the use of excess silver nitrate is the fact that some silver nitrate is removed (reduced to metallic silver) by the reducing sugars in the corn steep. The precipitated silver chloride was removed by filtration and the pH of the filtrate was raised to 3.8 by the addition of potassium hydroxide. The washed, filtered corn steep solids were then added to the filtrate and the resulting dechlorinated corn steep liquor was used to prepare the medium.

*Example C*

Corn steep liquor was dechlorinated with 125% silver nitrate in the following manner:

(A) The corn steep was dechlorinated as in Example B but was not reconstituted, that is, the solids originally removed by filtration were not put back in.

(B) Exactly as in Example B, that is, the same as in A above but reconstituted.

(C) Exactly as in Example B, or in A above except that the filtrate from removal of corn steep solids was diluted with only one volume of water instead of four.

The chlorine ion in p. p. m. of final medium contributed by the corn steep liquor was as follows: A, 1.2; B, 1.4; C, 0.68.

*Example D*

Corn steep liquor (about one liter) was filtered to remove solids and the solids were washed with chloride-free water. Washings and filtrate were combined and the filtrate was diluted to twice the original volume of the corn steep liquor and dechlorinated by passage down through a column two inches in diameter, containing about 2 liters of resin, of anion exchange resin IR–45 (a weakly basic anion exchange resin available from Rohm and Haas, Philadelphia, Pennsylvania, having a polystyrene-divinyl-benzene matrix with primary amino groups; similar to Dowex-3) in the nitrate form. The content of chloride ion dropped to 120 p. p. m., which was about 2.4 p. p. m. when used in the fermentation level at the one per cent level.

The process above was repeated using IR–45 in the sulfate form to give dechlorinated corn steep #2 which contributed about 0.3 p. p. m. when used at the one per cent level.

The increase in tetracycline produced by the use of the cottonseed endosperm flour of the present invention is illustrated by the results obtained in the following "control" examples, in which this medium constituent was not used.

CONTROL EXAMPLE I

A medium comprising 1% sucrose, 1.5% $KH_2PO_4$, 0.5% $(NH_4)_2HPO_4$, 0.2% $MgSO_4$ and 1% corn steep liquor was prepared in 200 ml. quantities per one liter Erlenmeyer flask in duplicate, autoclaved 15 minutes at 15 pounds, cooled and inoculated with a 24 hour vegetative inoculum of *Streptomyces viridifaciens* developed in corn-steep medium at the rate of 1 ml. inoculum/200 ml. medium. The inoculated flasks were agitated on a reciprocating shaker at 28° C. for 48 hours and harvested for assay. The harvested broths were centrifuged and upon assay by paper strip chromatography were found to contain about 0–5% tetracycline and about 100–95% chlortetracycline.

CONTROL EXAMPLE II

The broth from a 120 gallon tank containing 80 gallons of the medium of Control Example I after 44 hours fermentation contained no more than one to two parts tetracycline per eight parts chlortetracycline.

The broth from a 600 gallon tank containing 350 gallons of the medium of Control Example I after 45 hours fermentation contained no more than one to two parts tetracycline per eight parts chlortetracycline.

CONTROL EXAMPLE III

*Streptomyces viridifaciens* was aerobically fermented, using 1.0 cc. vegetative inoculum per 100 cc. medium, for 96 hours and then assayed by the ultra-violet absorption technique and by paper strip chromatography. The medium used was as follows:

| | |
|---|---|
| $K_2HPO_4$ | 0.05%. |
| $KH_2PO_4$ | 0.1%. |
| $MgSO_4$ | 0.02%. |
| $CaCO_3$ | 0.2%. |
| Sodium glutemate | 0.1%. |
| $HBO_3$ | 54 mcg./l. |
| $CuSO_4.5H_2O$ | 400 mcg./l. |
| $MNSO_4.4H_2O$ | 80 mcg./l. |
| $(NH_4)_6Mo_7O_{24}.4H_2O$ | 36 mcg./l. |
| $ZnSO_4.7H_2O$ | 10 mgm./l. |
| $FeSO_4.7H_2O$ | 1 mgm./l. | plus additional constituents tabulated below and distilled water q. s. 100%.

The results obtained were as follows:

| Run | #1 | #2 | #3 | #4 | #5 | #6 |
|---|---|---|---|---|---|---|
| Additional Constituents of Medium: | | | | | | |
| Sucrose......percent.. | 2.0 | 3.0 | 3.0 | 3.0 | 3.0 | 3.0 |
| $KNO_3$..........do.... | 0.2 | 0.2 | 0.1 | 0.2 | 0.2 | 0.2 |
| Soypeptone....do.... | 0.6 | 0.6 | | | | |
| dl-Tryptophane.do.... | | | 0.2 | | | |
| l-Tyrosine......do.... | | | | 0.1 | | |
| dl-Methionine..do.... | | | | | 0.2 | |
| dl-Serine.......do.... | | | | | | 0.05 |
| Tetracycline Equivalents by Ultra-violet Assay in mcg./ml. | 147 | 190 | 85 | 81 | 90 | 65 |
| Tetracycline Content in Percent by paper strip chromatography | 70–75 | 60–70 | 55–65 | 50–60 | 70–75 | 60–70 |

Again, low potencies were obtained and the broth contained large amounts of chlortetracycline (at least 25%).

CONTROL EXAMPLE IV

A fermentation medium was prepared containing 3% sucrose, 2% corn steep, 0.2% $(NH_4)_2SO_4$, 0.625% $CaCO_3$, 0.003% $ZnSO_4$ and distilled water q. s. 100%. The medium was autoclaved, subsequently, inoculated with a 1% vegetative inoculum of *Streptomyces viridifaciens*, aerobically fermented for 114 hours and found to contain 395 mcg./ml. chlortetracycline and 155 mcg./ml. tetracycline.

Reference to use in media, for example, of 5.0 percent dechlorinated corn steep liquor refers to use as one-twentieth of the medium of a dechlorinated corn steep liquor-containing the same concentration of nutrients (other than those removed as by filtration) as were present in the original, commercially available corn steep liquor (i. e. 50 per cent solids grade); alternately to provide a 5 per cent medium, use is made as one-tenth of the medium of a corn steep liquor which has been diluted with an equal volume of water during dechlorination, etc.

We claim:

1. A process for the production of tetracycline which comprises aerobically growing a culture of a chlortetracycline-producing species of Strepomyces selected from the group consisting of *Streptomyces aureofaciens* and *Streptomyces viridifaciens* in an aqueous carbohydrate solution containing a mixture of 0.1 to 10.0 per cent of substantially oil-free cotonseed endosperm flour and 0.1 to 10.0 per cent of a member selected from the group consisting of bakers' yeast and dechlorinated corn steep liquor.

2. A process for the production of tetracycline which comprises aerobically growing a culture of *Streptomyces aureofaciens* in an aqueous carbohydrate solution containing a mixture of 0.1 to 10.0 per cent of substantially oil-free cottonseed endosperm flour and 0.1 to 10.0 per cent of a member selected from the group consising of bakers' yeast and dechlorinated corn steep liquor.

3. A process for the production of tetracycline which comprises aerobically growing a culture of *Streptomyces viridifaciens* in an aqueous carbohydrate solution containing a mixture of 0.1 to 10.0 per cent of substantially oil-free cottonseed endosperm flour and 0.1 to 10.0 per cent of a member selected from the group consisting of bakers' yeast and dechlorinated corn steep liquor.

4. A process for the production of tetracycline which comprises aerobically growing a culture of a chlortetracycline-producing species of Streptomyces selected from the group consisiting of *Streptomyces aureofaciens* and *Streptomyces viridifaciens* in an aqueous, carbohydrate carbohydrate solution containing as its major source of organic, nitrogenous nutrients a mixture of 0.1 to 10.0 per cent substantially oil-free cottonseed endosperm flour and 0.1 to 100 per cent bakers' yeast.

5. A process for the production of tetracycline which comprises aerobically growing a culture of a chlortetracycline-producing species of Streptomyces selected from the group consisting of *Streptomyces aureofaciens* and *Streptomyces viridifaciens* in an aqueous carbohydrate solution containing as its major source of organic, nitrogenous nutrients a mixture of 0.1 to 10.0 per cent substantially oil-free cotonseed endosperm flour and 0.1 to 10.0 per cent dechlorinated corn steep liquor.

6. A process for the production of tetracycline which comprises aerobically growing a culture of a chlortetracycline-producing species of Streptomyces selected from the group consisting of *Streptomyces aureofaciens* and *Streptomyces viridifaciens* in an aqueous, carbohydrate solution containing as its major source of organic, nitrogenous nutrients a mixture of 0.5 to 2.0 per cent of substantially oil-free cotonseed endosperm flour and 0.5 to 3.0 per cent bakers' yeast.

7. A process for the production of tetracycline which comprises aerobically growing a culture of a chlortetracycline-producing species of Streptomyces selected from the group consisting of *Streptomyces aureofaciens* and *Streptomyces viridifaciens* in an aqueous carbohydrate solution containing as its major source of organic, nitrogenous nutrients a mixture of 0.5 to 2.0 per cent substantially oil-free cottonseed endosperm flour and 1.0 to 3.0 per cent dechlorinated corn steep liquor.

References Cited in the file of this patent

UNITED STATES PATENTS

| | | |
|---|---|---|
| 2,482,055 | Duggar et al. | Sept. 13, 1949 |
| 2,516,080 | Sobin et al. | July 18, 1950 |
| 2,516,682 | Donovick | July 25, 1950 |

OTHER REFERENCES

Bailey: Cotton Seed, 1948, Interscience Pub. Inc., New York, pages 615–629.

Bulletin No. 18, Eng. Exptl. Sta., U. of Tennessee, Knoxville, pp. 8–9.

Duggar: Ann. N. Y. Acad. Sci., vol. 51, art 2, pp. 179–180.

Backus et al.: Ann. N. Y. Acad. Sci., vol. 60, Art. 1 pp. 86–95.